United States Patent
Chen et al.

(10) Patent No.: US 7,197,026 B2
(45) Date of Patent: Mar. 27, 2007

(54) METHOD AND SYSTEM FOR RLP OPTIMIZATION

(75) Inventors: Xiaodong Chen, San Diego, CA (US); Sarvesh Asthana, San Diego, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/746,939

(22) Filed: Dec. 23, 2003

(65) Prior Publication Data

US 2005/0135423 A1    Jun. 23, 2005

(51) Int. Cl.
  *H04B 7/216* (2006.01)
  *H04J 3/22* (2006.01)
  *H04J 13/00* (2006.01)
(52) U.S. Cl. .................. 370/342; 370/441; 370/469; 370/479
(58) Field of Classification Search ............... 370/229, 370/231, 320, 335, 342, 441, 473, 479, 469
  See application file for complete search history.

(56) References Cited

U.S. PATENT DOCUMENTS

| | | | |
|---|---|---|---|
| 6,208,620 B1 * | 3/2001 | Sen et al. .................. | 370/231 |
| 6,330,451 B1 * | 12/2001 | Sen et al. ................. | 455/452.2 |
| 6,507,582 B1 * | 1/2003 | Abrol ........................ | 370/394 |
| 6,697,352 B1 * | 2/2004 | Ludwig et al. ............. | 370/349 |
| 6,772,227 B2 * | 8/2004 | Alkhatib ..................... | 709/245 |
| 6,807,428 B2 * | 10/2004 | Casaccia ..................... | 455/515 |
| 6,850,769 B2 * | 2/2005 | Grob et al. ................. | 455/515 |
| 2004/0090916 A1 * | 5/2004 | Hosein ....................... | 370/235 |
| 2005/0057781 A1 * | 3/2005 | Kajiwara .................... | 358/400 |

OTHER PUBLICATIONS

RFC: 193, "Transmission Control Protocol" Information Sciences Institute, University of Southern California, Sep. 1981, pp. 15-19.*
Park et al., "Performance Improvements of TCP Protocol for Mobile Data Service", Aug. 1997, IEEE -0-7803-4198, pp. 1871-1875.*

* cited by examiner

*Primary Examiner*—Chi Pham
*Assistant Examiner*—Tri H. Phan
(74) *Attorney, Agent, or Firm*—Alston & Bird LLP

(57) ABSTRACT

A method and system for improving the efficiency of radio communication by optimizing at the radio link protocol (RLP) layer. When TCP segments are passed down from the TCP layer at a sending device, they are accompanied by TCP segment information such as TCP segment length or TCP segment number. The RLP layer receiving the data stores the TCP-segment information along with the data, and divides the data into frames for transmission. Using the TCP information, when the RLP layer receives a NAK indicating loss of an RLP frame for which retransmission will not occur, the RLP layer drops not only that frame, but also any other buffered frames associated with the same TCP segment with which the lost frame was associated, regardless of whether the other frames have been transmitted.

18 Claims, 6 Drawing Sheets

METHOD AND SYSTEM FOR RLP OPTIMIZATION

FIELD OF THE INVENTION

The present invention relates generally to radio telephony, and more specifically to a method and system for optimizing the operation of the radio link protocol layer (RLP) based on early detection of data lost in transmission.

BACKGROUND OF THE INVENTION

Mobile telephones and similar communication devices are becoming more popular, and are being used for an ever-increasing number of services, or functions. These multiplying services impose greater demands on mobile communication networks, and require ever-more efficient methods of transmission over the air interface.

Mobile telephones are in essence portable radios, used by subscribers to communicate with a mobile telecommunication network. In order to give mobile subscribers the capability of connecting when they travel, numerous antennas are placed throughout the network coverage area and generally speaking, a mobile station communicates with the network through the antenna nearest or best-suited to its current location.

FIG. 1 is a simplified block diagram illustrating selected components of a mobile telecommunications system 100, such as one in which the present invention may be implemented. Mobile telephone 101 is currently within range of antenna 110 and able to establish a communication channel using appropriate network protocols. Transmissions from mobile station 101 received at antenna 110 are processed by base station 130 operating under the direction of base station controller 140. Although only one mobile station 101 is shown, in an actual mobile network there could be a great many, several of which are communicating via antenna 110 and base station 130.

Base station 130, as already mentioned, is itself under the control of base station controller 140. Base station controller 140, in turn, is connected with mobile switching center 150. Mobile switching center 150 handles communications originating with mobile station 101 and routes them through mobile telecommunication network 100. Also shown in FIG. 1 are, antennas 105 and 115, which corresponding with base stations 125 and 135, respectively. Base stations 125 and 135 are both controlled by base station controller 145, which also routes communications through mobile switching center 150. Mobile switching center 150 is one example of a number of such switches (not shown but) normally present in a mobile telecommunication network for routing calls from one subscriber to another or to other communication networks when appropriate. Calls to and from other networks will usually be routed through a gateway having an inter-working function (also not shown) that not only transfers information from one network to another but also reformats it as necessary to adjust to varying protocols. Other well-known communication networks, for example, include the public-switched telephone network (PSTN) and the Internet.

Returning to FIG. 1, the area covered by an antenna is often referred to as a cell. The network 100 coverage area is divided into a large number of such cells, three of which are delineated with broken lines. Although cells are often thought of as separate areas, they may overlap with each other or even be completely enclosed within other cells. Where cell coverage overlaps, the communicating base station may be the one best able to handle the additional traffic, or the choice may be made for other reasons. A mobile station traveling from one cell to another switches from communicating through one antenna to communicating through another in a process called handover. During the handover process, the mobile station may actually be communicating with or through two or more antennas.

The cellular architecture of mobile telecommunication network 100 means that mobile stations may use relatively low power for transmitting to a nearby base station. This of course means less battery capacity is required, an important consideration for a portable device. It also means that radio signals transmitted by a mobile station (as well as those of the base station with which it is communicating) will generally not interfere with those of mobile stations in non-adjacent cells. Communication frequencies may therefore be "re-used" in distant cells, vastly increasing the traffic capacity of telecommunication network 100.

Within a given cell, multiple mobile stations may engage in concurrent communication sessions when one of several multiple access techniques is employed. In frequency division multiple access (FDMA), different portions of the network operator's allocated frequency spectrum are used to create different channels, with each mobile station is assigned one or more frequencies as needed. These assignations are normally for one communication session only, and when a call is complete the frequencies are released for use by another. In time division multiple access (TDMA), each frequency is further divided into a number of time slots, creating even more channels. A TDMA network may in this way assign multiple mobile stations to a single frequency, with each transmitting only in their assigned time slot (or slots). The slots are long enough and occur with sufficient regularity that the discontinuous nature of even a voice transmission is generally imperceptible to subscribers.

Rather than assigning frequency channels, code division multiple access (CDMA) assigns a unique spreading code or codes to each mobile-station communication session. Signals are spread using the spreading code prior to transmission such that the receiver, knowing the spreading-code assignment, decodes only those transmissions it is intended to receive. The spreading codes are generated to be mutually orthogonal so that they do not interfere with each other.

These multiple access techniques have permitted rapid growth in the number of mobile telephone subscribers. For most, an acceptable communication channel is almost always available except perhaps during peak periods in high-traffic areas. At the same time, advances in technology have made mobile stations both smaller and less expensive. In other words, the cost of mobile station use in terms of both inconvenience and money has gone down. As performance and affordability continue to improve, many subscribers are beginning to use their mobile stations instead of, rather than in addition to their familiar wire line telephones.

The different uses in which mobile stations may be employed are also increasing. Originally (and often still primarily) used for voice communication, they frequently communicate other types of information as well. For example, a short message service (SMS) message may be sent from or received by a mobile station subscriber. These simple text messages permit brief communications between parties even if they are not simultaneously available. Longer text messaging is now often available as well, in some cases being achieved by concatenating a series of SMS messages.

Email applications are also becoming more common, permitting wireless mobile station users to send and receive email using devices that may be equipped with a full keyboard for composition. Access to the Internet creates still more uses for mobile stations. If network 100 provides an appropriate gateway (not shown), subscribers may request a Web page (or perhaps an abbreviated version of one from a Web site. In some applications, a personal computer may actually use the communication capability of a wireless mobile station for full Internet access.

As should be apparent, the amount of information, both voice and data, being transmitted over mobile telecommunication networks is much greater now than was initially experienced, and is still growing rapidly. This means that a tremendous amount of data must be handled by the network. It should be remembered, however, that most, if not all, of the communication within telecommunication network 100 takes place over a wire, cable, optical fiber or some other form of relatively high-speed connection, except for the radio connection between mobile station and base station. This radio channel, often called the air interface, is therefore the most resource-critical part of the entire communication path. Efficiency gains realized in the air interface typically affect system capacity and performance.

Needed therefore is a modified transmission scheme that more efficiently utilizes bandwidth and power resources without sacrificing quality of service. The present invention provides just such a solution.

SUMMARY OF THE INVENTION

The present invention is directed to a technique for more efficient utilization of the air interface in a radio telecommunication system through optimization of the interface between the TCP (transmission control protocol) layer and the RLP (radio link protocol) layer.

In one aspect, the present invention is a method of transmitting information over an air-interface radio channel including the steps of providing a first protocol layer in a communication device for segmenting the data to be transmitted into identifiable segments, providing a second protocol layer for receiving segmented data from the first protocol layer, dividing each segment into frames and buffering the frames for transmission, where the second protocol layer also receives from the first protocol layer and stores segment information sufficient so that the frames containing information from a particular segment may be associated with other frames containing information from that same segment so that in the event of frame transmission failure all associated frames stored in the second protocol layer buffer may be deleted. In one embodiment, the method is applied in a telecommunication network operable according to a CDMA scheme and the first protocol layer is a TCP layer and the second layer is a RLP layer. The segment data used to associate individual RLP frames may include a TCP segment sequence number assigned at the TCP layer and an indication of the length of the segment.

In another aspect, the present invention is a mobile station operable in a telecommunications network, including a first and second protocol layer for, respectively, segmenting and framing data to be transmitted to another communication station. The segmented data is passed from the first protocol layer of the mobile station to the second along with segment information. The second protocol layer divides each segment into frames that can be associated with each other using the segment information, and stores the frames in a buffer until it determines when each frame should be transmitted. Transmitted frames are preferably kept in the buffer temporarily in case retransmission is needed, as indicated by the receiving station. When such an indication, which may be a negative acknowledgement (NAK) message, is received, retransmission may be attempted as allowed by system parameters. Upon detecting that transmission of a frame has wholly failed, however, the mobile station deletes all frames associated with the failed frame so that they are not transmitted multiple times unnecessarily. Frame transmission continues with the next non-associated frames.

In yet another aspect, the present invention is a system for transmitting information over a communication channel that includes an air interface, the system including a sending station and a receiving station, where at least the sending station uses a protocol stack that includes a TCP layer for receiving data to be transmitted from upper protocol layers and segments the data into identifiable segments, the protocol stack further including an RLP layer for receiving the segmented data along with segment-identification information from the TCP layer and dividing the data into frames that can be associated with each other using the segment-identification information as including data from the same segment so that if one frame so associated cannot be successfully transmitted, the other associated frames are deleted from the RLP buffer immediately to avoid their needless transmission. The system may provide that the precise number of retransmissions attempted before a frame is determined to have failed in transmission may be negotiated between the sending station and the receiving station.

BRIEF DESCRIPTION OF THE DRAWINGS

For a more complete understanding of the present invention, and the advantages thereof, reference is made to the following drawings in the detailed description below.

DETAILED DESCRIPTION

FIGS. 1 through 6, discussed herein, and the various embodiments used to describe the present invention are by way of illustration only, and should not be construed to limit the scope of the invention. Those skilled in the art will understand the principles of the present invention may be implemented in any similar radio-communication device or system, in addition to those specifically discussed herein.

The radio-communication device used as an example here in is a mobile radio telephone. Initially, however, it should be noted that as the terms for radio telephones, such as "cellular (or cell) phone" and "mobile phone" are often used interchangeably, they will be treated as equivalent herein. Both, however, are a sub-group of a larger family of devices that also includes, for example, certain computers and personal digital assistants (PDAs) that are also capable of wireless radio communication in a radio network. This family of devices will for convenience be referred to as "mobile stations" (regardless of whether a particular device is actually moved about in normal operation). In addition, the terms "information" and "data" will be used interchangeably herein unless a distinction is explicitly stated or apparent from the context.

Figure 6:
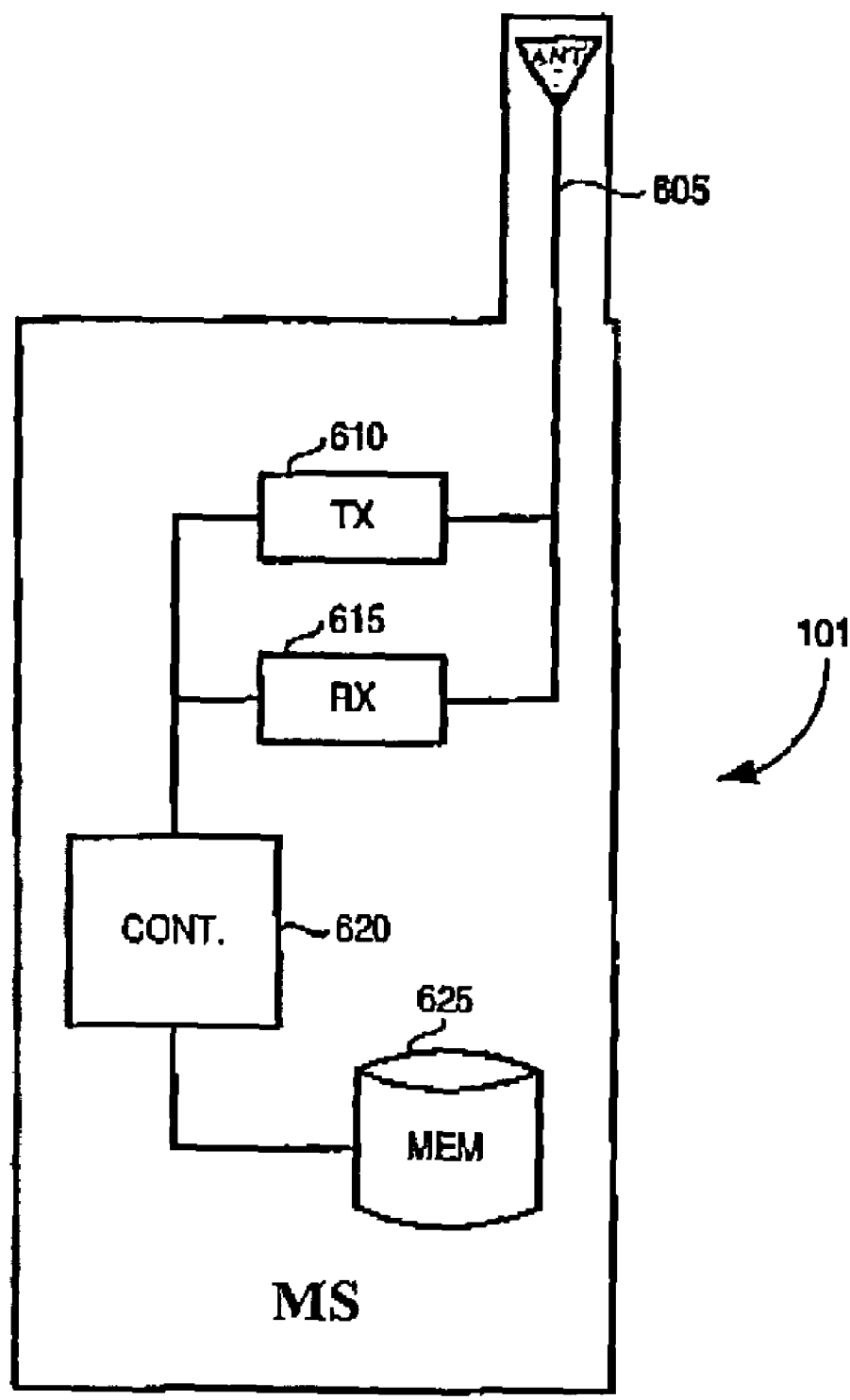
FIG. 6 is a simplified block diagram illustrating selected components of the mobile station shown in FIG. 1, which may be adapted for use according to an embodiment of the present invention.

FIG. 6 is a simplified block diagram illustrating selected components of mobile station 101 (shown also in FIG. 1), which may be adapted for use according to an embodiment of the present invention. Mobile station 101 includes transmit circuitry 610 and receive circuitry 615 for communicating with other stations via antenna 605. The operation of transmit circuitry 610 and receive circuitry 615 is controlled by controller 620, which is connected to memory device 625. Although not separately shown in FIG. 6, the mobile station 101 is configured to send and receive information according to a standard transmission scheme such as CDMA, applying a protocol stack such as the one illustrated in FIG. 2, below, or a similar one operable according to an embodiment of the present invention.

Figure 1:
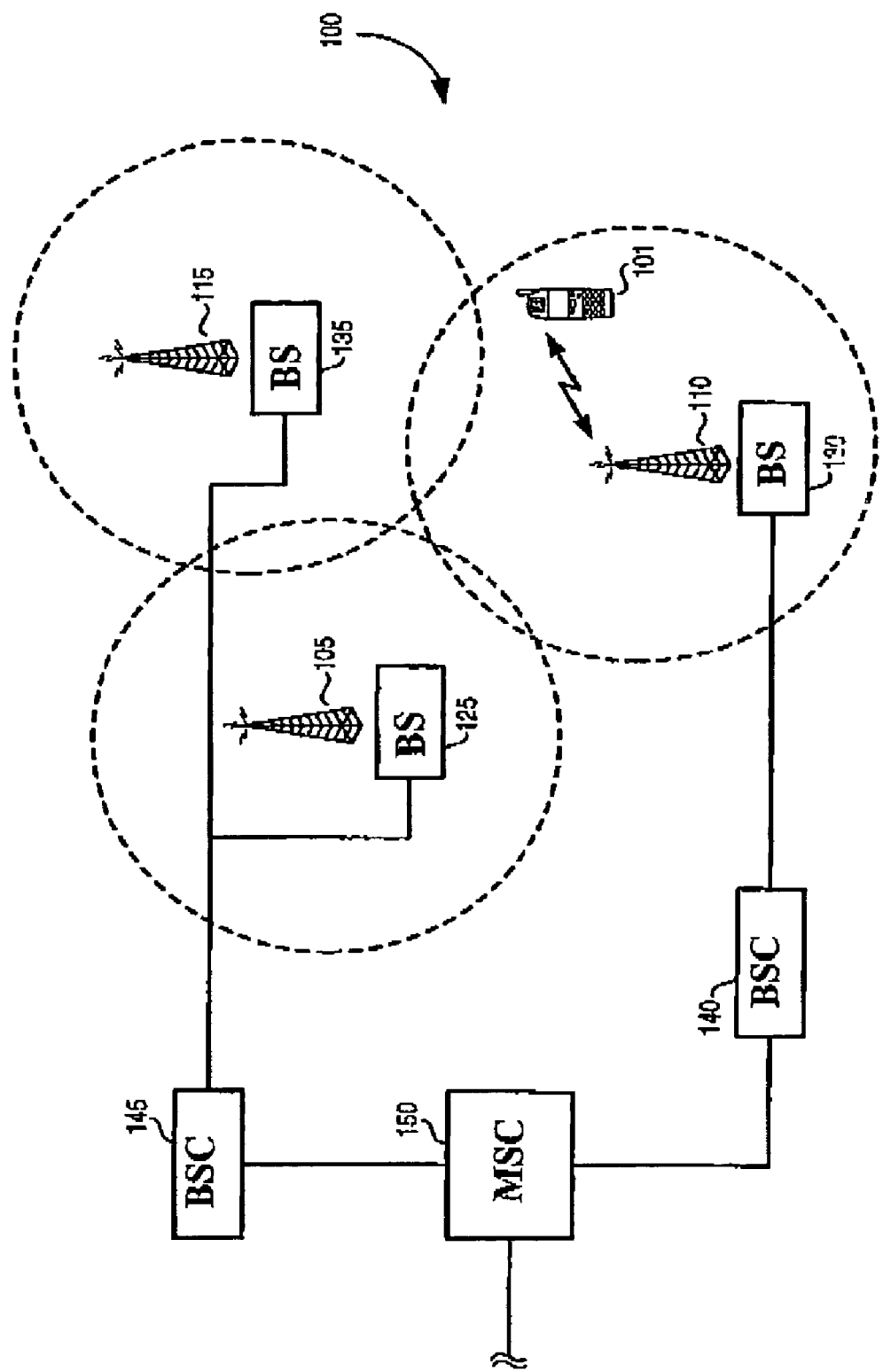
FIG. 1 is functional block diagram illustrating the relationship of selected components of a typical CDMA telecommunication network, such as one that might advantageously employ the hybrid receiver of the present invention.
Figure 2:
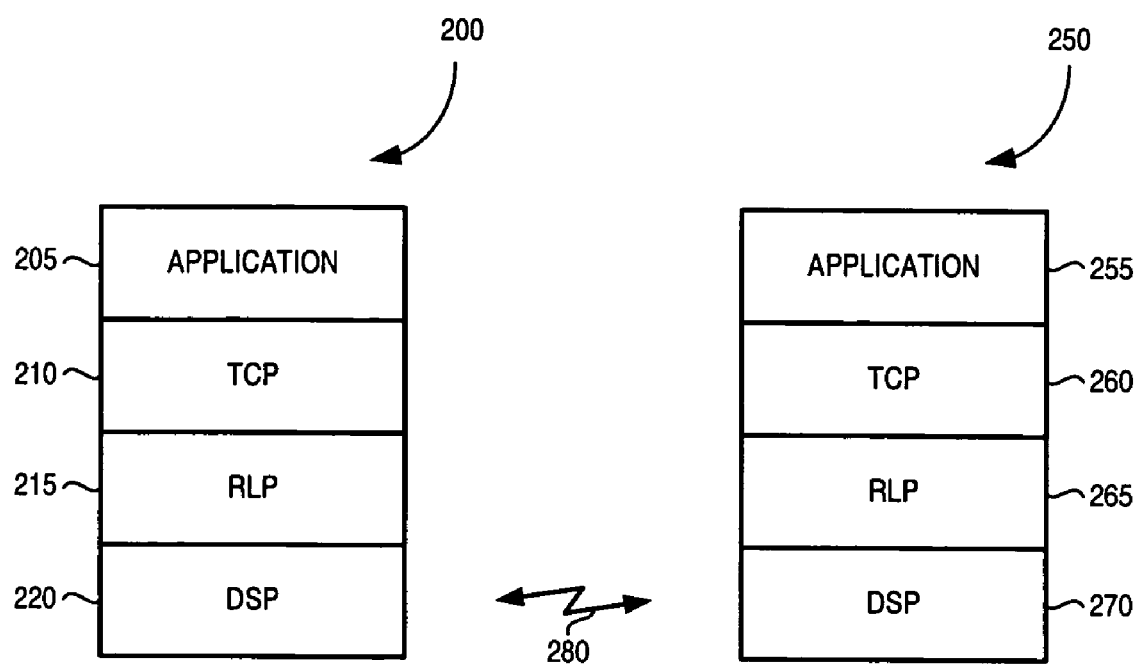
FIG. 2 is an illustration of a CDMA protocol stack for transmitting data in accordance with an embodiment of the present invention.

The present invention is directed to an improved communication scheme for use by a device such as mobile station 101 operating in a mobile telecommunication network, and particularly to one operable according to a CDMA protocol such as IS-95 or IS-2000 (also sometimes referred to as CDMA2000). As alluded to above, in such a network the data transmission process may be viewed from the perspective of a layered protocol stack. FIG. 2 is an illustration of a CDMA protocol stack 200 for transmitting data in accordance with an embodiment of the present invention. In this embodiment, the receiving station also uses a an identical protocol stack 250, although such identity is not required.

In the model illustrated in FIG. 2, each layer communicates with adjacent layers in the course of transmitting or receiving data. Data from application layer 205 is provided to TCP layer 210 where it is divided into discrete segments, usually of a pre-defined length. Each TCP segment is then assigned a sequence number or other identifier so that the data may be reassembled in the receiver (represented in FIG. 2 by protocol stack 250).

Data segmented in the TCP layer 205 is then passed down to the radio link protocol (RLP) layer 210. RLP layer 210 buffers the TCP segments, and divides each segment into frames, with each frame including a portion of a TCP segment. The RLP frames are identified with a frame ID number and represent a basic transmission unit. The length of an RLP frame (and hence how many frames are used for the data in one TCP segment) may vary according to the current conditions on the air-interface channel 280.

As should be apparent, data transmitted over air-interface channel 280 is received at the communication device having protocol stack 250 where in the illustrated embodiment, it is received and processed by the DSP layer 270. (Note that although described in terms of a transmitting station and a receiving station, the devices using protocol stacks 200 and 250 will each generally include both a transmitter and a receiver.) Ultimately, the protocol stack 250 will attempt to reassemble the transmitted data and reproduce it in the form in which it was transmitted, or in another appropriate form usable to the receiving station.

Any communication system is susceptible to data loss during transmission. Mobile radio telecommunication systems may be more susceptible than others due to the inconsistent nature of the air-interface channel and the relative motion of transmitter and receiver with respect to each other. To counter the effects of data loss, most communications system employ some form of error checking and correction. The receiver performs its error-checking algorithm, and if it is unable to compensate for the error itself, it notifies the transmitter that an error (data loss) has occurred. The receiver, for its part, retains a copy of the transmitted information so that it may be retransmitted if necessary.

The transmitting device may acknowledge the receipt of discreet data transmissions. When the transmitter receives an acknowledgement (ACK) message from the receiver, it knows that the identified data has been successfully transmitted and need no longer be stored. In such systems, the failure to receive an ACK message confirming data transmission within a certain predetermined amount of time will automatically trigger the retransmission of the data.

The RLP layer error-correction scheme, however, is typically NAK (negative acknowledgement) oriented. In such a scheme, retransmission of data only occurs upon receipt of a NAK message identifying the lost data. When a NAK message is received at the RLP layer 215, it will retransmit the frame or frames identified in the message as lost. Generally speaking, retransmission frames take precedence over RLP frames being sent for the first time (though not over RLP control frames, if any.) If a particular frame cannot be successfully transmitted within a pre-determined number of attempts, however, the RLP layer 215 drops the frame. (The number of attempted retransmissions is normally agreed upon at call set-up or limited by the system, or both.)

Where the dropped RLP frame or frames are part of a TCP segment, then the TCP layer 260 of receiver protocol stack 250 will detect that an anticipated segment does not contain all of the data it is supposed to, and for that reason cannot be reassembled for passing up to the application layer 255. When this occurs, TCP layer 260 discards the defective segment and initiates a TCP segment recovery. Significantly, this may or may not occur prior to the successful transmission of all RLP frames associated with a given TCP segment. As a result, RLP frames in the same TCP segment may be transmitted multiple times unnecessarily, once as part of an original transmission (or a retransmission), and (at least) a second time as part of the TCP segment recovery procedure initiated by TCP layer 260. This unnecessary retransmission wastes both bandwidth and battery resources.

Figure 5:
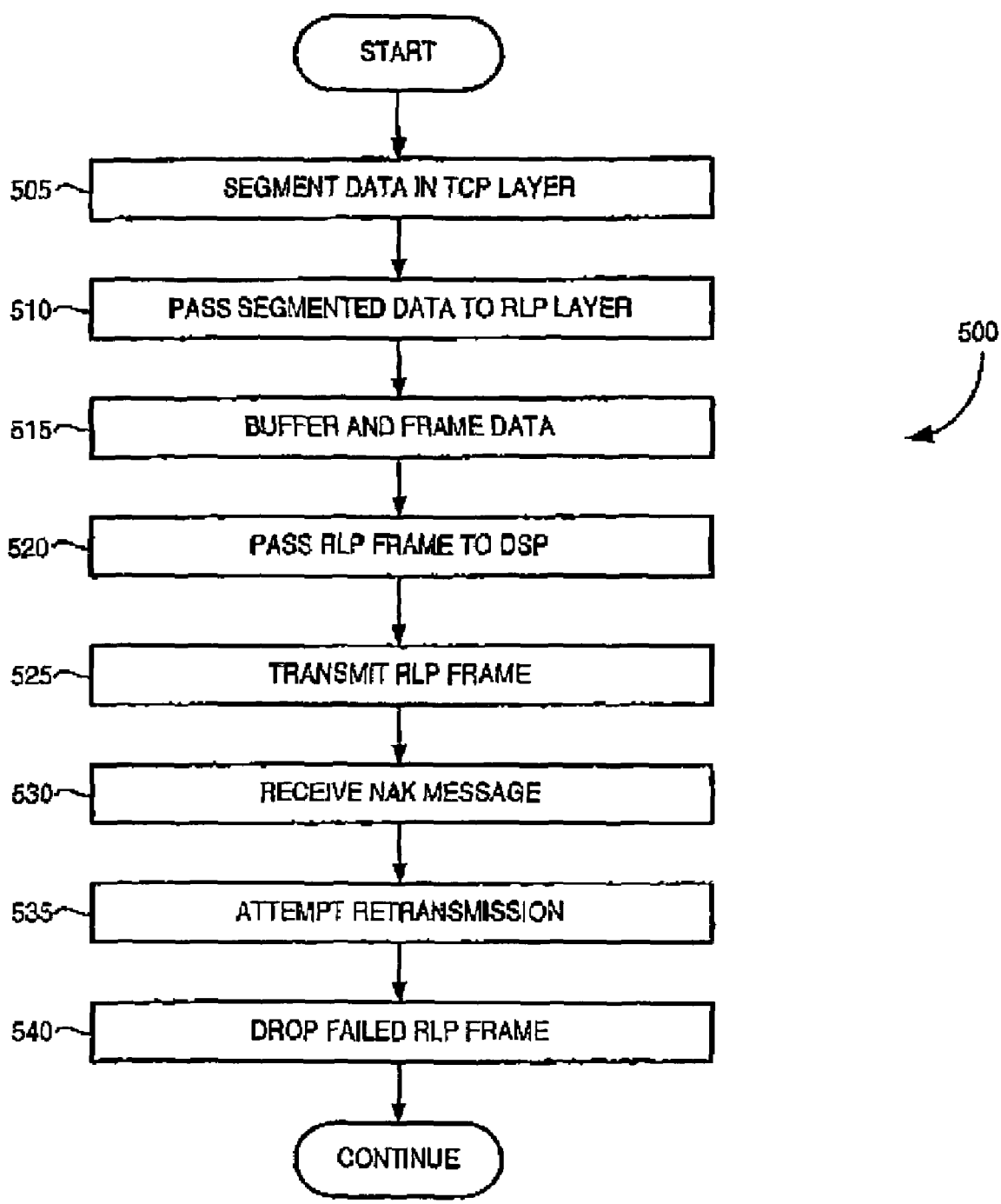
FIG. 5 is a flow diagram illustrating an operation of sending data in a mobile telecommunication network according to the prior art.

This inefficiency is illustrated by the process shown in FIG. 5. FIG. 5 is a flow diagram illustrating an operation 500 of sending data in a mobile telecommunication network according to the prior art. At START certain information had been selected for transmission to another communication node (the receiving station) with which contact has or is being made. The data from the upper protocol layers is provided to the TCP layer where it is segmented (step 505). The segmented data is then passed the RLP layer (step 510), where it is buffered and framed for transmission (step 515). In sequence, the buffered frames are then passed to the DSP layer (step 520) when they are to be transmitted (step 525). Generally speaking, the RLP layer controls the timing and data content of each transmission event. Transmission step 525 is repeated any number of times until all of the data has been transmitted (or until the transmission is interrupted for some other reason, for example failure of the communication channel.)

If a particular RLP frame is not successfully received in the intended receiver, the receiving station generates and transmits a NAK message identifying the frame (step not shown). When the sending station receives a NAK message (step 530), it attempts retransmission of the frame (step 535). More than one attempt to retransmit (upon receipt of a subsequent NAK) may be made, depending on the parameters set up by the system and negotiated with the receiving station. When the maximum number of retransmits has been reached, the frame is simply dropped (step 545).

Figure 3:
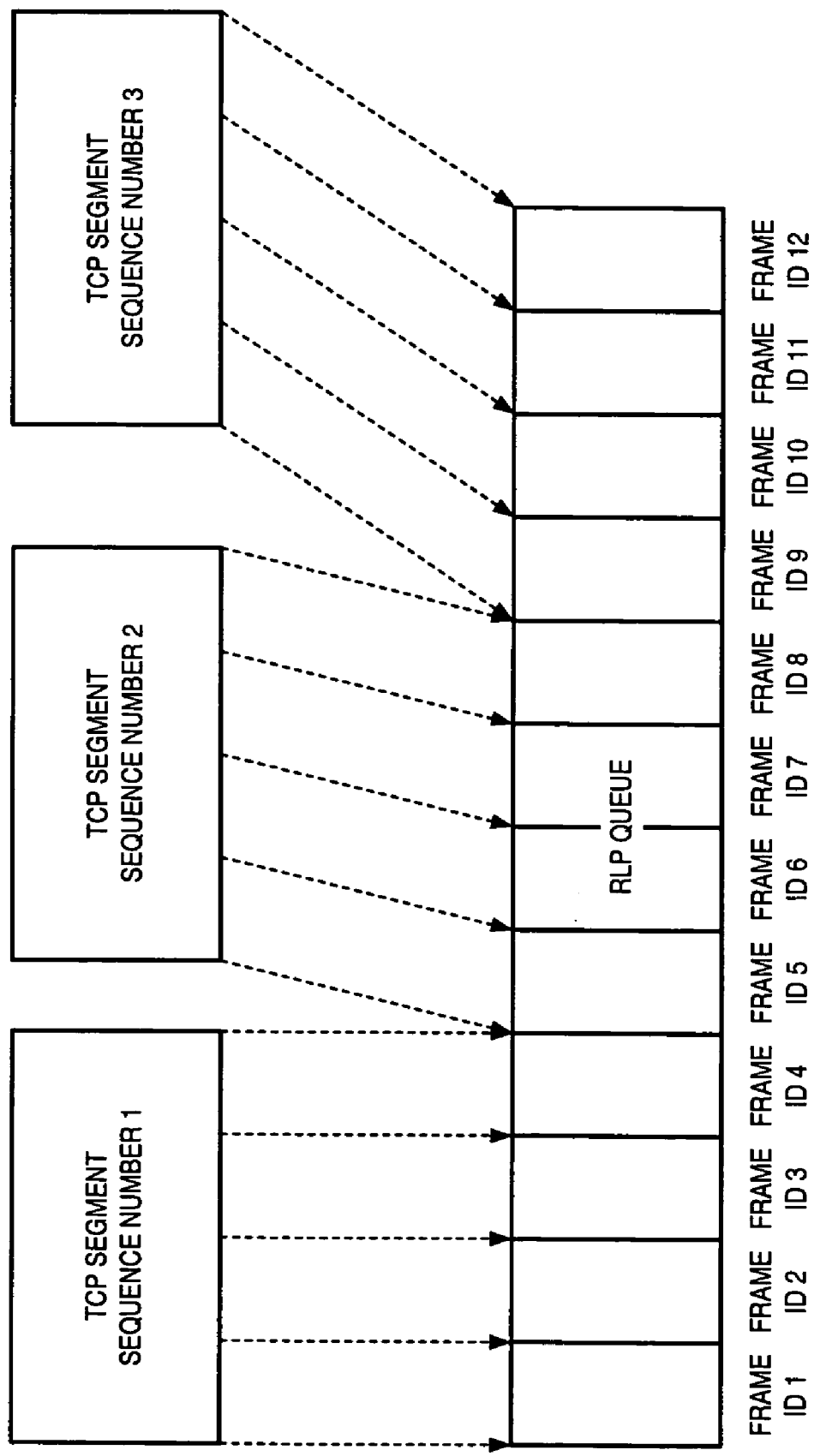
FIG. 3 is a simplified block diagram illustrating an aspect of the interface between the TCP layer and the RLP layer.

The effect of this operation may be more clearly seen with reference to FIGS. 2 and 3. FIG. 3 is a simplified block diagram illustrating an aspect of the interface between the TCP layer 210 and the RLP layer 215 as the data is passed down from the former to the latter. At the top of FIG. 3 are shown three exemplary TCP segments enumerated as TCP segment sequence numbers 1, 2, and 3, respectively. These three segments are illustrative of a typically much larger block of data received from application layer 205 and segmented for transmission. As mentioned above, the TCP layer 210 then passes the information down to RLP layer 215 where it is buffered (queued) and divided into frames. In the embodiment of FIG. 3, the frames in the RLP queue are enumerated Frame id 1 through Frame id 12.

Frames id 1 through Frame id 12 are transmission units and will be passed individually to DSP layer 220 to be processed for transmission at an appropriate time, beginning with Frame id 1. As should be apparent, when Frame id 1 through Frame id 4 have been successfully transmitted, all of the data associated with TCP segment 1 will have been sent. Eventually, Frame id 1 through Frame id 4 will be dropped because the required time period for buffering them has expired with no NAK messages or other requests for their retransmission. The transmission process will likewise be used to send Frame id 5 through Frame id 8, into which the data of TCP segment 2 is divided 9 (and for the remaining RLP frames as well).

To illustrate an embodiment of the present invention, again referring to FIGS. 2 and 3, it is assumed that after successfully transmitting Frame id 1 through Frame id 5, Frame id 6 fails to successfully transmit and is eventually dropped by the RLP layer 215. In prior art communication systems, as illustrated to this point in FIG. 5, transmission nevertheless continues with the sending of Frame id 7, Frame id 8, and so forth.

When the data received in the receiving station, however, TCP layer 260 will obtain from RLP layer 265 only Frame id 5, Frame id 7, and Frame id 8, meaning that upon inspection the TCP segment 2 will be discovered to be incomplete. When this occurs, TCP layer 260 will discard the (incomplete) segment and initiate a recovery procedure. The recovery procedure typically entails notifying TCP layer 210 that the segment 2 requires retransmission. This, in turn, often requires TCP layer 210 to again pass segment 2 to the RLP layer 215 where it will be divided into frames for transmission.

According to an embodiment of the present invention, however, spectrum and power resources are concerned by anticipation of this condition. In this embodiment, when a NAK message is received with respect to a transmitted RLP frame, a retransmission attempt still occurs, as do whatever subsequent retransmission attempts are permitted. Eventually though, a transmission failure may occur with respect to an RLP frame when some indication of an unsuccessful transmission is detected and no more retransmission attempts are provided for. In this embodiment, when transmission failure occurs, the RLP layer identifies the TCP segment with which the failed RLP frame is associated. The RLP layer 215 is able to do this because in accordance with the present invention, the TCP layer 210 passed down information describing each segment going to the RLP layer. When each segment is divided into RLP frames for transmission, the segment information is stored along with it so that the RLP frames can be associated with the segment whose data the are carrying.

The segment information typically includes a unique (to the current session) sequence or other identification number and an indication of the length of the segment. All that is required of the segment information, however, is that it be sufficient for the RLP to later identify the RLP frame or frames whose contents make up a particular TCP segment. More precisely, all the RLP frames associated with a given segment must be identifiable; it is not strictly required that the specific segment be known to the RLP layer.

RLP frames buffered by RLP layer 210 and associated with a frame that has failed in transmission are deleted. Of course, some of the associated RLP frames: may already have been transmitted successfully, but in many cases not all of them will have. The RLP frames are of course transmitted in turn, but will be interspersed with (higher-priority) RLP frames being retransmitted as well. A particular RLP frame being deleted may not have been successfully transmitted because it had not yet reached the front of the queue, or because its initial transmission was unsuccessful and all allowable retransmissions have yet to occur. In deleting RLP frames associated with a failed RLP frame, however, the sending device does not transmit them unnecessarily (as they form part of a TCP segment that will be found incomplete and itself entirely discarded). Naturally, when the TCP layer 260 initiates a recovery procedure for the defective (and discarded) TCP segment, the information contained in the deleted RLP frames will be passed down for reframing and transmission as would normally occur.

Figure 4:
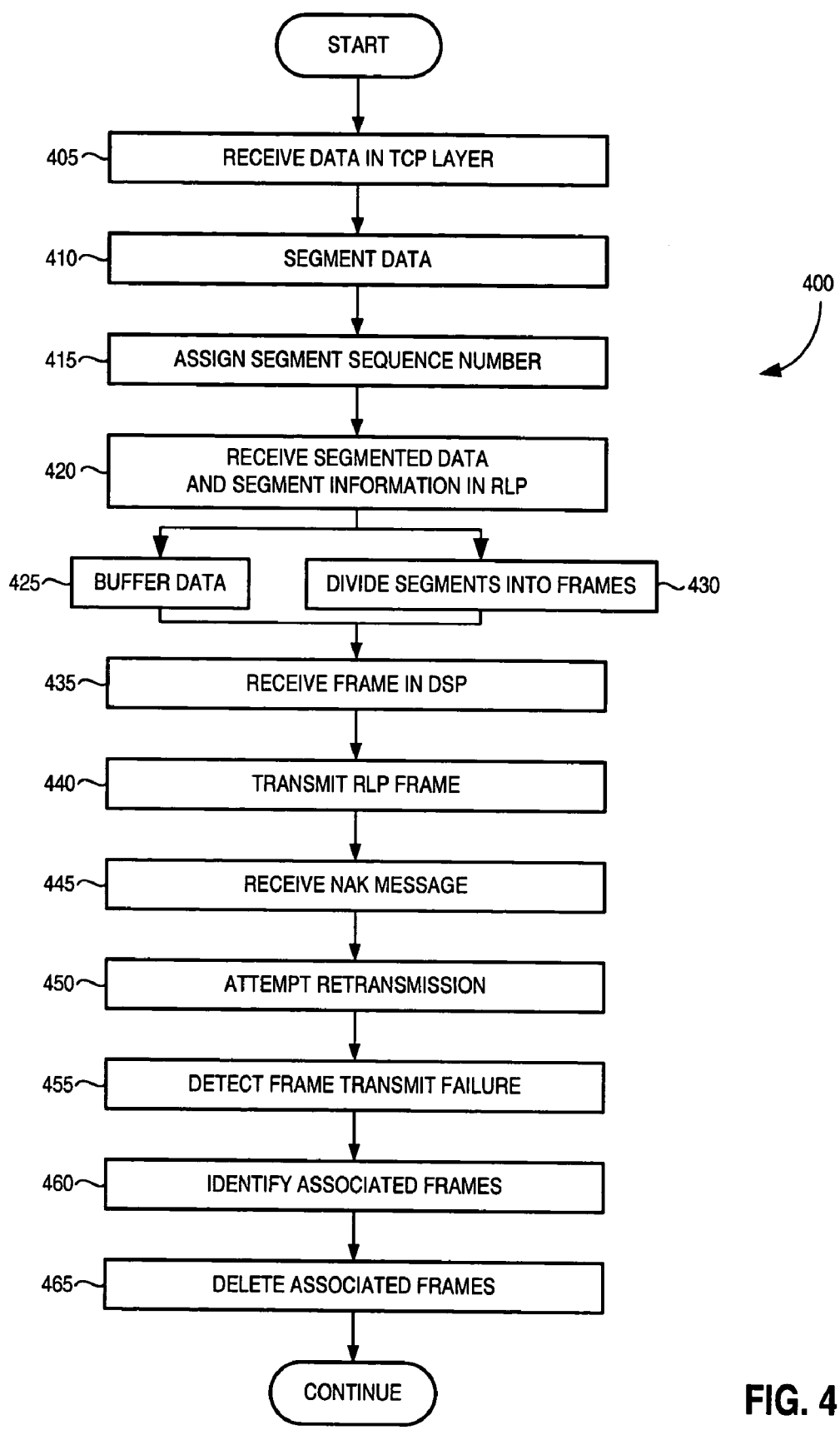
FIG. 4 is a flow diagram illustrating a method of efficiently transmitting information via a radio channel according to an embodiment of the present invention.

FIG. 4 is a flow diagram illustrating a method 400 of efficiently transmitting information via a radio channel according to an embodiment of the present invention. At START, it is assumed that a radio telecommunication system such as the CDMA network of FIG. 1 has been provided with a protocol arrangement identical or functionally similar where necessary to the one illustrated in FIG. 2. In this regard, however, it is not required that both the sending station and the receiving station be equally capable of transmitting according to the method of the present invention.

The process begins when information to be transmitted is formed in a sending station application layer and passed to the TCP layer (step 405). The TCP layer segments the information (step 410) and assigns a unique segment sequence number to each segment (step 415). The sequence number will identify the specific data contained in the segment in case it needs to be reformed as part of a lost-segment recovery procedure (step not shown).

The process continues as each segment is passed to the RLP layer (step 420) along with segment information sufficient to identify the segment. The segmented data and the segment information associated are stored (buffered) in the RLP layer (step 425) and the data is divided into frames for transmission (step 430). The RLP frames are then in turn passed to a DSP layer for transmission (step 435) and eventually transmitted to the receiving station (step 440).

When a NAK message is received with respect to a given RLP frame (step 445), then retransmission of that frame will be attempted (step 450). Note that the constraints of the network and any protocols negotiated between the sending station and the receiving station will ultimately determine whether one, several, or any retransmission attempts will be made for a given frame. (At least one retransmission attempt is expected, but retransmission attempts are not required in the present invention unless specifically recited in a particular embodiment.) If retransmission is successful (in general, meaning that a subsequent NAK message has not been received), the transmission of other RLP frames simply continues without further interruption.

When transmission failure with respect to an RLP frame is detected (step 455), however, then the stored segment information is used to determine which other RLP frames are associated (that is, derived from the same TCP segment) as the failed frame (step 460). The associated frames are then deleted (step 465). The process of FIG. 4 is of course performed with respect to the transmission of additional RLP frames in like fashion.

Note that as a result of implementing this method, pointless transmission of RLP frames is avoided because they are not sent only to be later deleted as part of an incomplete TCP segment. This efficiency will not occur in all cases, of course, such as when the failed frame is the final frame associated with a TCP segment and all other associated RLP frames have been successfully transmitted. No inefficiency will result, however, from deleting successfully transmitted frames at this stage. Some of the frames may in fact have already been dropped in consideration of this successful transmission, in which case no further action with respect to those frames is required.

The preferred descriptions are of preferred examples for implementing the invention, and the scope of the invention should not necessarily be limited by this description. Rather, the scope of the present invention is defined by the following claims.

What is claimed is:

1. A method of preparing for transmitting information over a radio channel, said method comprising the steps of:
providing a first protocol layer in a communication device to receive data representing the information to be transmitted, wherein the first protocol layer divides the data into identifiable segments, the identifiable segments each accompanied by segment information;
providing a second protocol layer in the communication device to receive the segmented data from the first protocol layer along with the segment information;
dividing the segmented data into frames at the second protocol layer for individual transmission of the frames;
storing each sequential frame into which the segmented data is divided in the second protocol layer along with an indication of the segment information associated with the segment that each frame was divided from;
providing a third protocol layer for processing the frames prior to transmission; and
deleting all stored frames associated with a same segment upon detecting that transmission of a frame associated with the same segment as the stored frame has been dropped,
wherein the segment information comprises an indication of segment length of a corresponding identifiable segment of the information to be transmitted.

2. The method of claim 1, wherein the communication device is configured according to a code division multiple access (CDMA) protocol.

3. The method of claim 2, wherein the first protocol layer is a transmission control protocol (TCP) layer.

4. The method of claim 3, wherein the second protocol layer is a radio link protocol (RLP) layer.

5. The method of claim 1, further comprising the step of transmitting at least one frame.

6. The method of claim 5, wherein the third layer comprises a DSP layer having a digital signal processing (DSP) and wherein at least one frame is passed to the digital signal processor (DSP) for processing prior to transmission.

7. The method of claim 5, further comprising the step of detecting that the at least one frame has failed in transmission.

8. The method of claim 7, wherein the step of detecting transmission failure comprises the step of receiving in the communication device a negative acknowledgment NAK) message associated with the at least one frame.

9. The method of claim 7, further comprising the step of identifying the segment from which the at least one frame was divided.

10. The method of claim 9, further comprising the step of identifying all stored frames into which the segment associated with the at least one frame was divided.

11. The method of claim 1, wherein the segment information comprises a segment sequence number.

12. A mobile station configured for operation in a telecommunication network, said mobile station comprising:
a transmitter for transmitting information-bearing radio signals;
a digital signal processing (DSP) layer coupled to the transmitter for processing information prior to transmission;
a radio link protocol (RLP) layer for storing and framing information and providing it to the DSP layer for processing;
a transmission control protocol (TCP) layer for dividing information into segments and providing it to the RLP layer for framing; and
wherein the segments passed from the TCP layer to the RLP layer are accompanied by segment information that is stored in the RLP layer so that when transmission failure of a frame is detected, all frames associated with the same segment as the failed frame are deleted, and
wherein the segment information comprises an indication of segment length of a corresponding segment of the information to be transmitted.

13. The mobile station of claim 12, wherein the segment information comprises a segment sequence number.

14. The mobile station of claim 12, wherein the telecommunication network is configured according to a CDMA communication scheme.

15. A mobile telecommunication system, comprising: a sending device for transmitting information over a radio channel;
a receiving device for receiving information transmitted over the radio channel; a
protocol stack in the sending device, comprising:
an application layer;
a TCP layer for receiving information to be transmitted from the application layer and dividing the information into segments the segments each accompanied by segment information comprising an indication of segment length of a corresponding segment of the information to be transmitted;

an RLP layer for receiving the segmented information from the TCP layer and storing the segmented information in association with the segment information, and for dividing each segment received from the TCP layer into frames for transmission;

a digital signal processing (DSP) layer for processing information prior to transmission, said digital signal processing layer adapted to receive frames formed at said RLP layer:

wherein the RLP layer removes from storage any RLP frames associated with a TCP segment when the RLP layer detects that an RLP frame forming a part of the TCP segment has failed in transmission.

16. The mobile telecommunication system of claim 15, wherein the sending device is a mobile station configured according to a CDMA communication scheme.

17. The mobile telecommunication system of claim 16, wherein the receiving device is a base station configured according to a CDMA communication scheme.

18. The mobile telecommunication system of claim 15, wherein frame transmission failure is detected upon receiving in the sending device a NAK message generated by the receiving device.

* * * * *